Oct. 9, 1962 F. RUSCHE 3,057,433
FLUID LINE LUBRICATION INDICATING METHOD
Filed Aug. 7, 1961

INVENTOR
FREDRIC RUSCHE
BY James H. Littlepage
ATTORNEY

United States Patent Office 3,057,433
Patented Oct. 9, 1962

3,057,433
FLUID LINE LUBRICATION INDICATING
METHOD
Fredric Rusche, 8125 Medina St., Detroit 17, Mich.
Filed Aug. 7, 1961, Ser. No. 129,726
1 Claim. (Cl. 184—1)

This invention relates to a method of indicating the rate of flow of a viscous lubricant, such as oil, into a pressurized gaseous fluid carrying conduit.

In this specification, and in the claim, the term "gaseous fluid" is defined to encompass all non-liquid fluids and mixtures thereof as well as steam, which for the purposes of this invention behaves like a gas.

One specific utilization of this invention is in conjunction with steam hammers of the type used in steam-actuated pile drivers, although other uses for the invention will be readily apparent to those skilled in the art.

In the operation of pile drivers of the aforementioned type, it is necessary to provide lubrication to the various moving parts of the steam hammer mechanism. A preferred way of providing such lubrication is to introduce oil into the line or conduit which conducts the hammer-actuating pressurized steam to the hammer. The steam and oil are thus inter-mixed within the conduit and are forced therealong and into the hammer mechanism for powering and lubricating same, respectively.

Many lubricators for introducing a lubricant into a pressurized fluid line have been proposed and used in the past. However, all of the prior lubricators of this type, with which I am familiar, either suffer the disadvantage of offering an operator no way to continually visually check that the proper amount of oil is being introduced into the fluid conduit, or, if they are equipped with indicating means of one kind or another, such means either increase the cost of the lubricator unduly, or are of a nature which causes them to malfunction often under field conditions of use. One object of this invention is to provide a novel, simple and economical fluid line lubricator which, when properly operated, will continually offer an observer an indication of the amount of oil being introduced into the fluid within the pressurized fluid line.

Another object of the invention is to provide a fluid line lubricator having means for controlling the rate of lubricant feed to a pressurized fluid line.

Another object of the invention is to set forth a method of operating a fluid line lubricator, whereby an observer or operator is continually provided with an indication of the amount of lubricant being introduced into a fluid line.

Another object of the invention is to provide a lubricator with a lubricant-containing reservoir, a sight glass communicating with the reservoir and the fluid line, and with means for forming bubbles in the lubricant in the reservoir, such bubbles providing a visual indication of lubricant flow to the fluid line as they pass through the sight glass while entrained in the lubricant.

Other objects will be apparent from the remainder of the specification and from the drawings.

In the drawings which form a part of this application:

Figure 1:
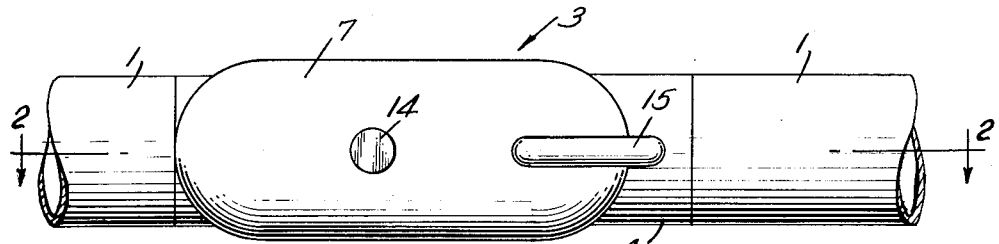
FIGURE 1 is a plan view of the lubricator of the invention shown interposed in a gaseous fluid-carrying conduit.
Figure 2:
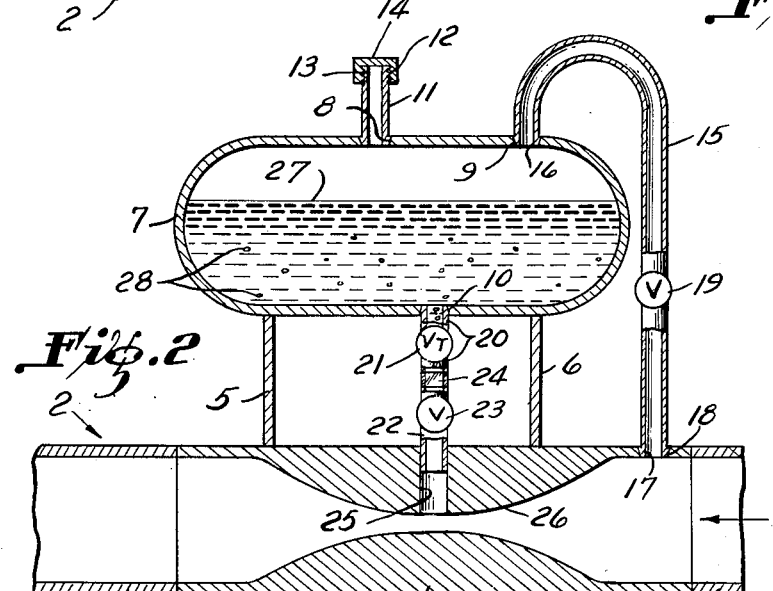
FIGURE 2 is a sectional view taken on the line 2—2 of FIGURE 1.
Figure 4:
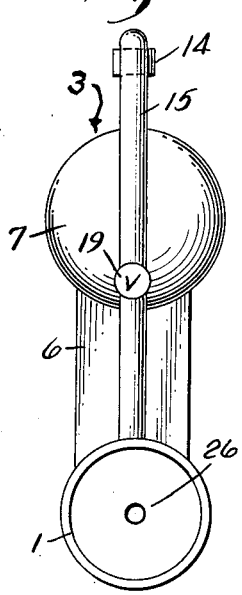
FIGURE 4 is a right-hand elevational view of the structure of FIGURE 3.
Figure 3:
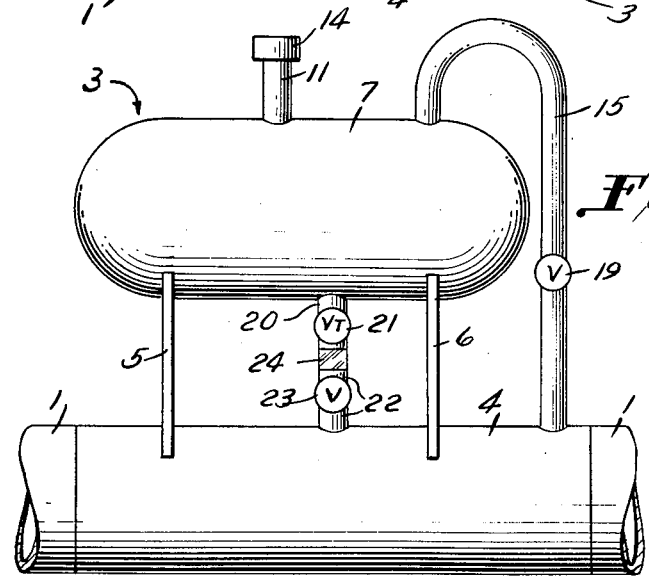
FIGURE 3 is a front elevation of the structure of FIGURE 1.

Referring to the drawings by reference numerals, the numerals 1, 1 represent aligned portions of a pressurized gaseous fluid-carrying flow line or conduit, designated generally as 2, in which is interposed the lubricator of the invention, designated generally as 3. The fluid flow line of which portions 1 and 1 are a part is adapted to join fluid pressurization apparatus (not shown) such as a pump or compressor (in the case of air), or a boiler (in the case of steam), or the like, to a pressure-fluid actuated mechanism (not shown) such as the steam hammer of a pile driver, or a jack hammer, or the like. The arrow in FIGURE 2 shows the direction of fluid flow through the flow line.

The lubricator 3, more particularly, is composed of a venturi-including tubular conduit section 4, the opposite ends of which are aligned with and fastened in fluid-tight relationship to the adjacent ends of portions 1 and 1 by means of threads or welding, or any similar conventional expedient, not shown. Fastened to, as by welding or the like, and upstanding from top exterior portions of section 4 are spaced, vertically oriented supports 5 and 6 which at their upper ends are welded, or otherwise fastened, to, and thereby carry in spaced relation to section 4, a lubricant reservoir 7. Reservoir 7 is a closed receptacle except for two apertures 8 and 9 formed in the top thereof and a single aperture 10 provided in the bottom thereof. A tubular inlet or fill pipe 11 is welded, or otherwise fastened in fluid-tight fashion in aperture 8 at its bottom end, and at its top end has formed thereon external threads 12 which cooperate with internal threads 13 formed on the interior surface of a closure cap 14 in such manner that the cap 14 may be screwed on pipe 11 to seal same when desired. To fill reservoir 7 with lubricant, all that is required is that cap 14 be removed.

A hollow conduit or pipe 15 has one of its ends 16 welded or, otherwise fastened in fluid-tight relationship in aperture 9, and the other of its ends 17 is fastened, in like manner, in an aperture 18 provided in the upper portion of section 4 at the upstream end thereof, adjacent the right-hand portion 1. Intermediate the ends of conduit 15 is interposed a conventional shut-off valve 19, which I term a "start-up" valve because of its function, which will be described later. When valve 19 is open, fluid may flow in either direction through conduit 15, but when valve 19 is closed, passage of fluid in both directions is blocked. It will be noted that the bottom of the flow path within conduit 15 is higher than the top of fill pipe 11. This prevents lubricant from flowing from the reservoir 7, through conduit 15 and into section 4 during filling of the reservoir, even if the reservoir should be filled to the top of pipe 11.

Fastened in aperture 10, and thus depending from reservoir 7, is a hollow conduit 20 intermediate the length of which is interposed a conventional throttle valve 21, the purpose of which is to control the "feed," or rate of flow, of lubricant from the reservoir 7 to the venturi section 4, and, thus, to the flow line 2. Fastened in an aperture 25, which extends radially upwardly from the throat 26 of the venturi formed in section 4, is a hollow conduit 22, intermediate the length of which is interposed a conventional shut-off valve 23, which is preferably, but not necessarily of the quick-acting type. When valve 23 is open, fluid may pass in either direction through conduit 22, but when valve 23 is closed, no fluid can flow through conduit 22 in either direction. The functions of valve 23 will be set forth in more detail as the description proceeds.

Interposed between the top end of conduit 22 and the lower end of conduit 20 is a conventional sight glass structure 24 which is equipped with the usual means (not shown) for attachment thereof in fluid-tight relationship, with the adjacent ends of conduits 20 and 22. By providing sight glass 24, the lubricant flow can be easily observed, as will presently be described.

The method of operating the lubricator of this invention follows. Let it be assumed, for the purpose of illustration, that flow line 2, with my lubricator 3 interposed therein, is connected between a gaseous fluid pressurizing mechanism, and a fluid pressure actuated mechanism, whereby high pressure gaseous fluid, which for illustrative purposes will be assumed to be air, is caused to flow through flow line 2 in the direction of the arrow in FIGURE 2. Further, let it be assumed that it is desired to introduce lubricant at a particular rate of feed into the pressurized gaseous fluid flowing through line 2, whereby lubricant will be intermixed with and carried along by the pressurized fluid to the working parts of the fluid pressure actuated mechanism for properly lubricating same.

The preferred way of operating my lubricator is to first close each of the three valves 19, 21 and 23, completely, thereby sealing off communication between flow line 2 and reservoir 7. Next cap 14 is removed from fill pipe 11 and reservoir 7 is filled, for example, to the level indicated by 27 in FIGURE 2 or higher, with the type of lubricating oil, or other lubricating fluid, required by the mechanism being operated and lubricated. After reservoir 7 has been filled, cap 14 is partially screwed back on pipe 11, but is not tightened fully so that a slight leakage of pressurized fluid between elements 11 and 14 can be achieved for a purpose to be described. The next step is to "charge" the lubricant in reservoir 7 with bubbles. This is accomplished by first opening valve 23 which allows air, which is above atmospheric pressure even though being extracted at the venturi-throat, to flow through aperture 25 from line 2, and then through conduit 22 and valve 23 into conduit 20 where further upward flow is blocked by closed valve 21. Next, however, valve 21 is opened, and this allows the pressured air to proceed upwardly through conduit 20, and then upwardly through the lubricant in reservoir 7. During its traverse upwardly through the lubricant, a portion of the pressured air is entrapped therein in the form of innumerable bodies, indicated at 28 in FIGURE 2. That air which is not entrapped continues upwardly and passes between loosened cap 14 and pipe 11 to atmosphere. Once the lubricant in reservoir 7 has been "charged" with air bubbles, valve 21 is closed, thus halting air flow into the reservoir, and cap 14 is screwed fully on pipe 11 to prevent further leakage. When the lubricant is "charged," as described, the lubricator is set to deliver lubricant to line 2 as contemplated by the invention. This point in the description corresponds to the condition of the reservoir depicted in FIGURE 2.

Now, when it is desired to add lubricant to line 2, the first step is to open the "start-up" valve 19. This causes high pressure air to flow through conduit 15 into the top of reservoir 7 thereby establishing a downward pressure on the lubricant therein. Next, valve 21 is opened slightly, whereupon the bubble-containing lubricant will begin to flow out of the bottom of reservoir 7, through conduit 20, sight glass 24, conduit 22, and then through and out the bottom of aperture 25 into the air passing through venturi throat 26. (As previously mentioned, the air at the venturi throat is not as highly pressurized as in the portions 1, 1, but it is always above atmospheric pressure while the compressor is operating as intended.) Thus, as the lubricant-including pressurized air travels along line 2 and into the actuated mechanism, the working parts of the mechanism receive lubrication.

The amount of lubricant being added to the air in conduit 2 can easily be judged by observing the rate of speed at which the bubbles are passing through the sight glass 24, and if the amount is considered to be too little or too much, the rate of lubricant flow may be quickly adjusted by the proper manipulation of the throttle valve 21.

To restate a portion of the previous description for the purpose of clarity, flow of the lubricant from reservoir 7 into the flow line 2 is caused by the fact that air, at substantially the high pressure of the air in the unrestricted portions of line 2 is acting downwardly upon the top of the lubricant, plus the fact that the pressure of the air in section 4 is reduced, from that in the unrestricted portions of line 2, as it passes through the venturi throat 26. Thus, under the conditions of operation just described, a pressure differential is established which positively causes the lubricant to enter throat 26, and thence line 2, through aperture 25.

When the air actuated mechanism being furnished lubrication by my lubricator is shut down (that is, rendered inoperative for one reason or another) the quick-opening valve 23 is closed. This prevents lubricant from flowing by gravity out of reservoir 7 and into line 2 when it is not needed. Two other alternative ways of stopping the gravity flow of lubricant during non-operating periods are to leave valve 23 open, and instead close either of valves 19 or 21. However, it is preferred that valve 23 be closed, since if valve 21 is closed it must be readjusted to produce the desired rate of lubricant feed when the actuated mechanism is started up again, and because, if valve 19 is closed, some lubricant will drip into line 2 until a partial vacuum develops above the lubricant in reservoir 7.

With proper "charging" my lubricator will, by means of the entrained bubbles passing through the sight glass 24, indicate the rate of lubricant flow as long as any lubricant is available in reservoir 7. When all of the lubricant has been exhausted from reservoir 7, this will be indicated by the lack of same in the sight glass, at which time an operator will be alerted to refill the reservoir. Each time the reservoir is refilled, it must again be "charged" as herein described.

While I have illustrated the reservoir 7 to be located directly above the line 2, it will be obvious to those skilled in the art that other orientations of reservoir 7 with respect to line 2 will, with certain obvious modifications, produce structures substantially equivalent in function and operation.

Having now described the structure and mode of operation of the invention, what I claim and desire to secure by Letters Patent is:

The method of providing a visual indication of the amount of lubricant being discharged from a lubricator of the type having a viscous lubricant-containing reservoir discharging lubricant into a pressurized gaseous fluid carrying conduit by way of a connecting line including a sight glass comprising the steps of: causing gaseous fluid to flow from said conduit through said connecting line and sight glass into said lubricant so as to form entrained bubbles of said fluid in said lubricant and then shutting off said fluid flow through said lubricant and causing said bubble-entraining lubricant to flow from said reservoir through said connecting line and said sight glass into said conduit whereby said bubbles, entrained in said lubricant, pass through said sight glass to provide an observer with a visual indication of the amount of lubricant being discharged into said fluid conduit.

References Cited in the file of this patent

UNITED STATES PATENTS

| | | |
|---|---|---|
| 700,797 | Morris | May 27, 1902 |
| 956,101 | Inglis | Apr. 26, 1910 |
| 1,055,139 | Fretter | Mar. 4, 1913 |
| 1,185,888 | Durham | June 6, 1916 |
| 2,304,644 | Heftler | Dec. 8, 1942 |
| 2,500,816 | Gird | Mar. 14, 1950 |

FOREIGN PATENTS

| | | |
|---|---|---|
| 213,430 | Great Britain | Apr. 3, 1924 |